(12) United States Patent
Iwami et al.

(10) Patent No.: US 8,539,127 B2
(45) Date of Patent: Sep. 17, 2013

(54) LINKUP STATE GENERATING METHOD, INFORMATION PROCESSING APPARATUS, AND LINKUP STATE GENERATING PROGRAM

(75) Inventors: Yoshikazu Iwami, Kawasaki (JP); Hidekazu Osano, Kawasaki (JP); Takayuki Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 645 days.

(21) Appl. No.: 12/630,430

(22) Filed: Dec. 3, 2009

(65) Prior Publication Data

US 2010/0228869 A1 Sep. 9, 2010

(30) Foreign Application Priority Data

Mar. 3, 2009 (JP) ................................. 2009-049502

(51) Int. Cl.
*G06F 13/10* (2006.01)

(52) U.S. Cl.
CPC .................................. *G06F 13/102* (2013.01)
USPC ........................................... 710/104; 710/10

(58) Field of Classification Search
USPC ........................................................ 710/105
See application file for complete search history.

(56) References Cited

U.S. PATENT DOCUMENTS

| | | | | |
|---|---|---|---|---|
| 4,549,075 A * | 10/1985 | Saada et al. | ................... | 713/169 |
| 4,695,952 A * | 9/1987 | Howland | ...................... | 710/306 |
| 5,918,055 A * | 6/1999 | Crawford et al. | ............. | 710/240 |
| 6,304,756 B1 * | 10/2001 | Hebeler et al. | ................. | 455/450 |
| 6,378,056 B2 * | 4/2002 | Nizar et al. | .................... | 711/170 |
| 6,499,079 B1 * | 12/2002 | Gulick | ........................... | 710/305 |
| 6,941,186 B2 * | 9/2005 | Naya et al. | ..................... | 700/121 |
| 6,965,839 B2 * | 11/2005 | Floyd et al. | ...................... | 702/85 |
| 6,985,502 B2 * | 1/2006 | Bunton | ........................... | 370/535 |
| 7,027,888 B2 * | 4/2006 | Naya et al. | ..................... | 700/121 |
| 7,631,280 B2 * | 12/2009 | Kanazawa | ..................... | 716/134 |
| 7,877,619 B2 * | 1/2011 | Rachakonda et al. | ......... | 713/310 |
| 2004/0225461 A1 * | 11/2004 | Floyd et al. | ...................... | 702/85 |
| 2005/0136972 A1 | 6/2005 | Smith et al. | | |
| 2006/0041696 A1 * | 2/2006 | Cherukuri et al. | ............ | 710/100 |
| 2006/0209687 A1 | 9/2006 | Yagawa et al. | | |
| 2008/0052645 A1 * | 2/2008 | Kanazawa | ......................... | 716/2 |

(Continued)

FOREIGN PATENT DOCUMENTS

| | | |
|---|---|---|
| JP | 07-248939 | 9/1995 |
| JP | 10-23482 | 1/1998 |

(Continued)

OTHER PUBLICATIONS

Japanese Office Action issued May 21, 2013 in corresponding Japanese Application No. 2009-049502.

*Primary Examiner* — Ryan Stiglic
(74) *Attorney, Agent, or Firm* — Staas & Halsey LLP

(57) ABSTRACT

A linkup state generating method for generating a state in which linkup is completed in first and second information processing apparatuses, the first and second information processing apparatuses each including a linkup function of, with parameter exchange, comparing parameters included in the first and second information processing apparatuses and adjusting specifications of the parameters so that the specifications of the parameters match each other, the linkup state generating method including setting, from the outside, a parameter in the first information processing apparatus so that a specification of the parameter included in the first information processing apparatus matches a specification of a parameter included in the second information processing apparatus, and sending, from the first information processing apparatus, a signal received from the second information processing apparatus to the second information processing apparatus in a manner that the second information processing apparatus recognizes that parameter exchange has been performed.

15 Claims, 14 Drawing Sheets

(56) References Cited

U.S. PATENT DOCUMENTS

| | | | |
|---|---|---|---|
| 2009/0083465 A1* | 3/2009 | Schaetzle et al. | 710/110 |
| 2009/0228611 A1* | 9/2009 | Ferguson et al. | 710/8 |

FOREIGN PATENT DOCUMENTS

| | | |
|---|---|---|
| JP | 10-301801 | 11/1998 |
| JP | 2003-298603 | 10/2003 |
| JP | 2003-309620 | 10/2003 |
| JP | 2004-7142 | 1/2004 |
| JP | 2006-262417 | 9/2006 |
| JP | 2007-519317 | 7/2007 |
| JP | 2008-270918 | 11/2008 |

* cited by examiner

LINKUP STATE GENERATING METHOD, INFORMATION PROCESSING APPARATUS, AND LINKUP STATE GENERATING PROGRAM

CROSS-REFERENCE TO RELATED APPLICATIONS

This application is based upon and claims the benefit of priority of the prior Japanese Patent Application No. 2009-49502, filed on Mar. 3, 2009, the entire contents of which are incorporated herein by reference.

FIELD

The embodiments discussed herein are related to a linkup state generating method, an information processing apparatus, and a linkup state generating program.

BACKGROUND

A technique for providing, in a processor of a processor system, a trace condition detection signal output terminal that can detect, from the outside, a trace condition detection signal is known. With this technique, a peripheral circuit can take in a trace condition detection signal via the trace condition detection signal output terminal. As a result, the peripheral circuit can perform state information tracing in association with program tracing performed by the processor. Therefore, detailed software debugging can be easily performed on the processor system including the processor and the peripheral circuit.

Also, a technique for connecting, via a connection line, a personal computer (PC) card that is a target device to be debugged to a host device that is a debugging device and performing debugging is known. With this technique, the target device executes a debugging program. Also, the target device sends output information of the debugging program to the host device, waits for a command from the host device, and, if a command is sent, performs processing specified by the command. Also, the host device outputs, to a display unit, POD_ID executed by the target device, line number, source file, comment, and the like.

SUMMARY

A linkup state generating method for generating a state in which linkup is completed in first and second information processing apparatuses, the first and second information processing apparatuses each including a linkup function of, with parameter exchange, comparing parameters included in the first and second information processing apparatuses and adjusting specifications of the parameters so that the specifications of the parameters included in the first and second information processing apparatuses match each other, the linkup state generating method including setting, from the outside, a parameter in the first information processing apparatus so that a specification of the parameter included in the first information processing apparatus matches a specification of a parameter included in the second information processing apparatus, and sending, from the first information processing apparatus, a signal received from the second information processing apparatus to the second information processing apparatus in a manner that the second information processing apparatus recognizes that parameter exchange has been performed.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

DETAILED DESCRIPTION OF EMBODIMENT(S)

In a system in which multiple large-scale integrated circuits (LSIs) that are information processing apparatuses are mutually connected, each of the LSIs performs a linkup operation with an encountered LSI at the time the system is started. According to an embodiment, two LSIs that encounter each other are forced to be successfully linked up and to enter an operating state. According to an embodiment, debugging for investigating a linkup function can be easily performed.

Linkup will now be described. In linkup, at the time the system is started, each LSI shakes hands with an encountered LSI and exchanges parameters. In exchanging the parameters, information indicating an operating mode, a checking mechanism, and the like supported by the LSI is sent to the encountered LSI. Also, the LSI receives, from the encountered LSI, information indicating an operating mode, a checking mechanism, and the like supported by the encountered LSI. Accordingly, the LSIs mutually exchange information indicating the operating mode, the checking mechanism, and the like supported by the individual LSIs. The LSIs internally perform automatic setting to adjust their parameters such as the operating mode and the checking mechanism to those with lower specifications of the parameters. As a result, the specifications of the parameters such as the operating mode and the checking mechanism of the two encountered LSIs can be adjusted to match each other. As above, an operation in which two encountered LSIs exchange parameters such as the operating mode and the checking mechanism and adjust the specifications of the parameters thereof so as to match each other is referred to as "linkup".

In order to describe linkup in a more detailed manner, a reference example LSI will be described below.

Figure 1:
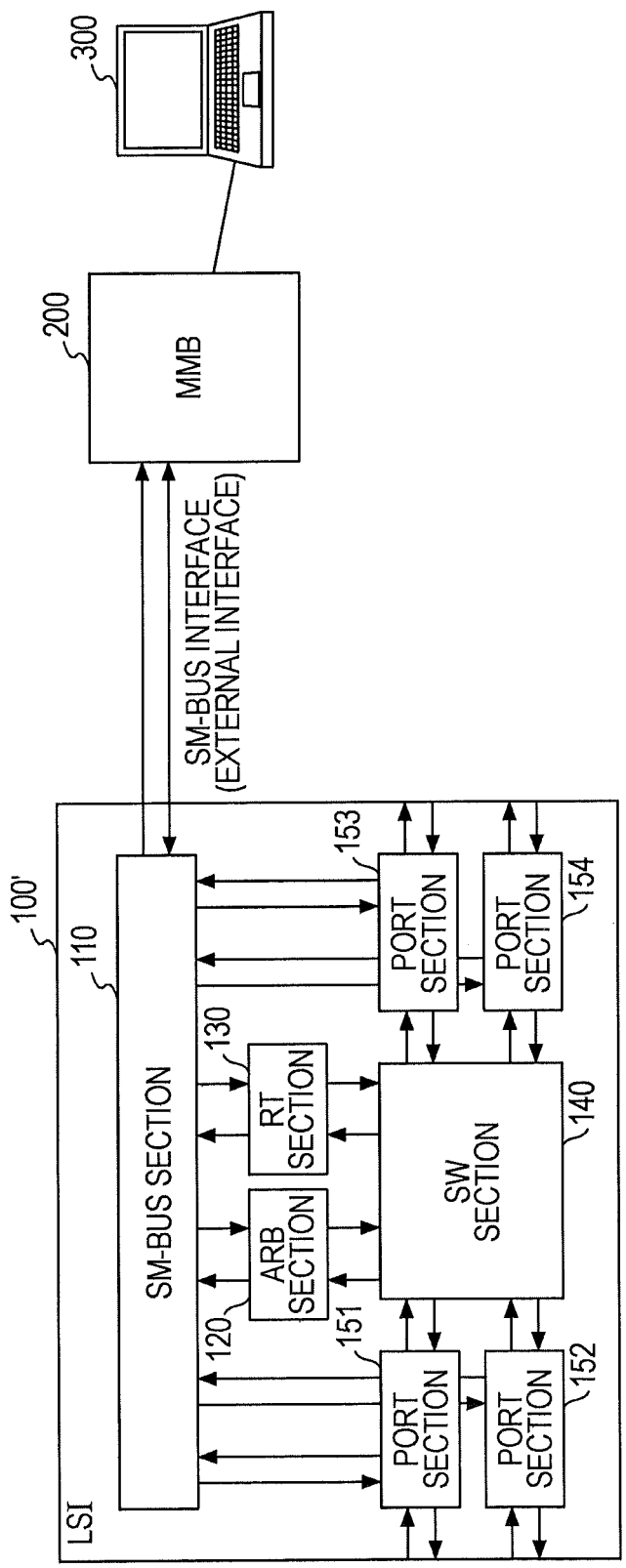
FIG. 1 illustrates the structure of a large-scale integrated circuit (LSI) of a reference example.

FIG. 1 illustrates the structure of an LSI 100' of a reference example. As illustrated in FIG. 1, the LSI 100' includes an SM-bus section 110 for establishing a connection with a management board (MMB) 200 connected to a terminal device 300 such as a PC for an administrator. The MMB 200 is a computer that manages and controls the system. The SM-bus section 110 controls an SM-bus interface which is a serial transfer interface equivalent to I2C, performs serial/parallel conversion, and generates an internal control signal.

The LSI 100' includes port sections 151 to 154. When sending and receiving packets to and from the outside of the LSI 100', each of the port sections 151 to 154 performs input/output buffer control and control on parameter exchange, which will be described later. The LSI 100' further includes an arbitration (ARB) section 120, a routing table (RT) section 130, and a switching (SW) section 140. The ARB section 120 performs arbitration control in response to requests from the port sections 151 to 154. The RT section 130 includes a routing table. The SW section 140 is a cross bar switch and, on the basis of information in the routing table, determines addresses of packets regarding requests from the port sections 151 to 154.

Figure 2:
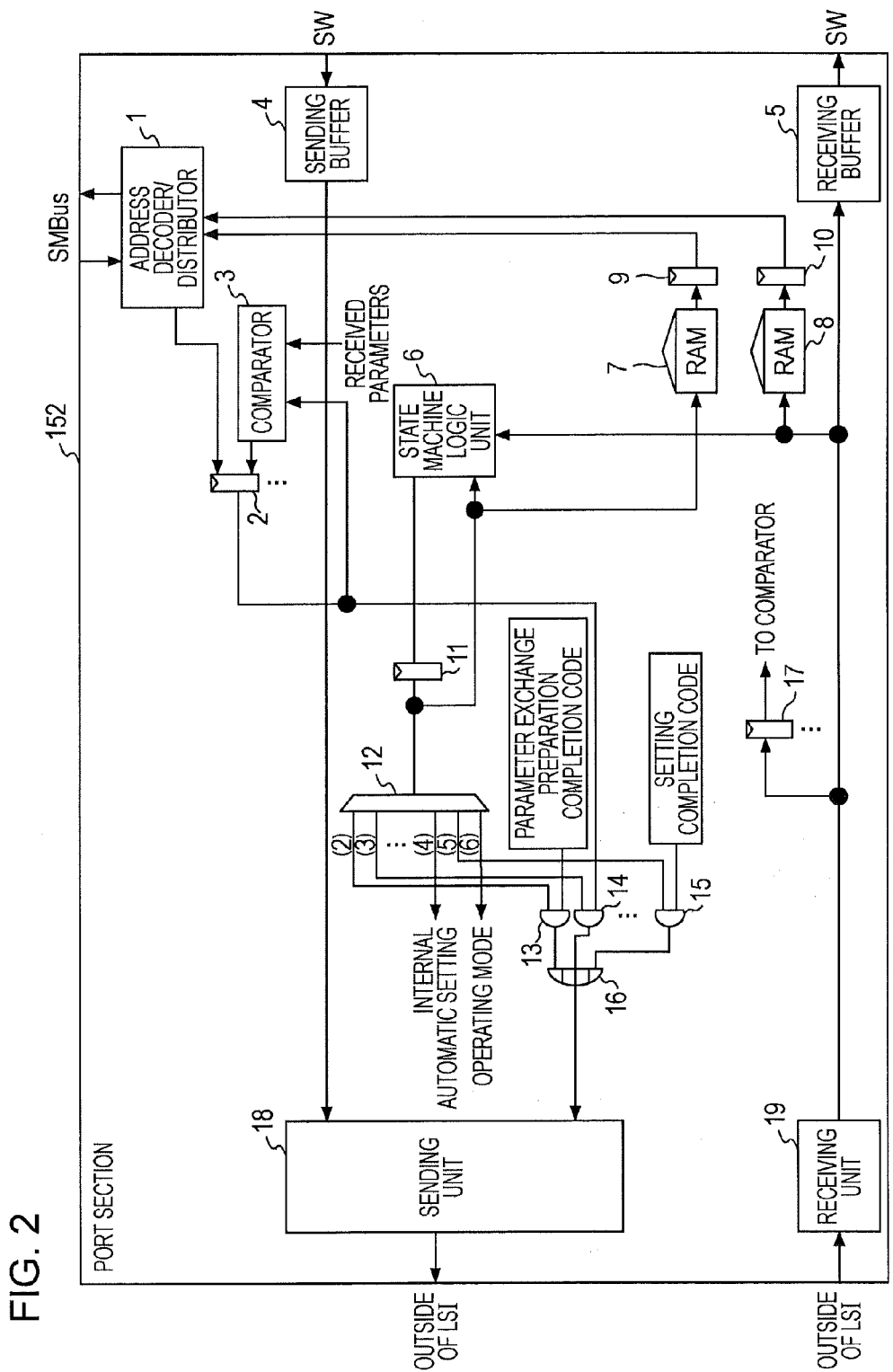
FIG. 2 illustrates the internal structure of a port section included in the LSI illustrated in FIG. 1.

FIG. 2 illustrates the internal structure of the port section 152, which is one of the port sections 151 to 154. Note that FIG. 2 extracts, from the port section 152, portions regarding a linkup function, and illustrates only the portions regarding a linkup function. For example, portions regarding an input/output buffer control function are not illustrated in detail in FIG. 2.

The port section 152 includes an address decoder/distributor 1, a parameter flip flop (FF) 2, a comparator 3, a sending buffer 4, and a receiving buffer 5. The address decoder/distributor 1 is connected to the SM-bus section 110 and exchanges signals with the MMB 200 via the SM-bus section 110. The parameter FF 2 stores parameters such as an operating mode and a checking mechanism supported by the LSI 100'. At the time of linkup with another LSI that the LSI 100' encounters, the comparator 3 compares the specifications of the parameters such as the operating mode and the checking mechanism supported by the LSI 100' with the specifications of the parameters supported by the encountered LSI. If necessary, the comparator 3 overwrites the specifications of the parameters stored in the parameter FF 2 with parameters with lower specifications of the parameters.

The sending buffer 4 is connected to the SW section 140 and receives, from the SW section 140, a signal to be sent from the port section 152 to the outside of the LSI 100'. The receiving buffer 5 is connected to the SW section 140 and passes a signal that is received by the port section 152 from the outside of the LSI 100' to the SW section 140.

The port section 152 further includes a state machine logic unit 6, random-access memories (RAMs) 7 and 8, and FFs 9 and 10. The state machine logic unit 6 will be described later using FIG. 4. At the time of linkup, the state machine logic unit 6 sequentially changes the state of the LSI 100'. For performing debugging to investigate the linkup function, the RAMS 7 and 8 and the FFs 9 and 10 save data regarding the operation of the state machine logic unit 6 and data received from the outside of the LSI 100'.

The port section 152 further includes a state FF 11, a decoder 12, AND elements 13, 14, and 15, and an OR element 16. The state FF 11 is provided for the state machine logic unit 6 to write information indicating the state of the LSI 100' in a linkup operation. The decoder 12 generates a signal for specifying information to be sent to the encountered LSI in accordance with the state written in the state FF 11. In response to a signal generated by the decoder 12, the AND element 13 outputs a parameter exchange preparation completion code, which will be described later. In response to a signal generated by the decoder 12, the AND element 14 outputs the parameters stored in the parameter FF 2. In response to a signal generated by the decoder 12, the AND element 15 outputs a setting completion code, which will be described later. The OR element 16 passes the information output from the AND elements 13, 14, and 15 to a sending unit 18.

The port section 152 further includes a receiving parameter FF 17, the sending unit 18, and a receiving unit 19. The receiving parameter FF 17 receives parameters received from the encountered LSI at the time of linkup, and passes the received parameters to the comparator 3. The sending unit 18 sends the information passed from the sending buffer 4 and the information passed from the OR element 16 to the encountered LSI. The receiving unit 19 receives information from the encountered LSI and transfers the information to the SW section 140 via the receiving buffer 5.

Figure 3:
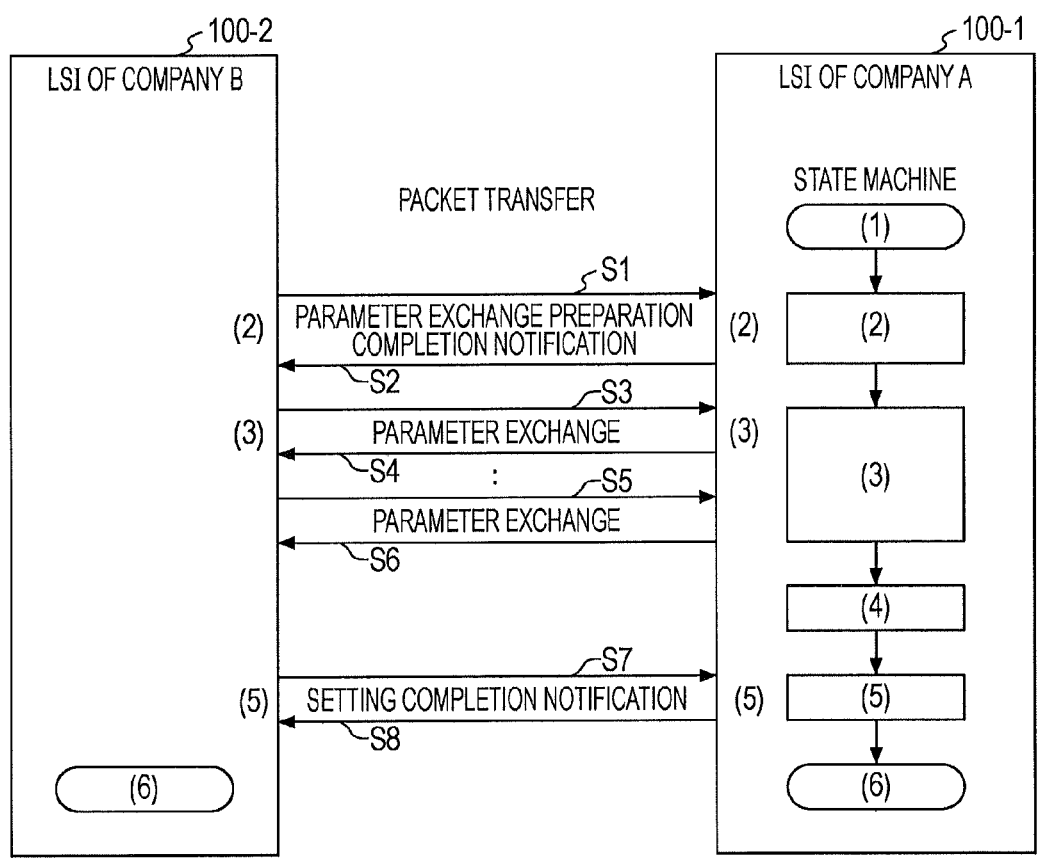
FIG. 3 describes an example of a linkup operation.

Referring now to FIG. 3, the flow of a normal linkup operation will be described.

In the example illustrated in FIG. 3, the case in which an LSI 100-1 of company A and an LSI 100-2 of another company or company B perform linkup is assumed. It is assumed that the LSI of company A has, for example, the structure described above using FIGS. 1 and 2. The linkup procedure described below proceeds in accordance with the transition of the state of the LSI 100-1 of company A, which sequentially changes from state (1) to state (6) by using the state machine logic unit 6.

In FIG. 3, the power of a system including the two LSIs 100-1 and 100-2 is turned on in state (1). As a result, with the function of the state machine logic unit 6, the state of the LSI 100-1 changes to state (2). In state (2), the LSI 100-1 sends a parameter exchange preparation completion code to the encountered LSI 100-2. That is, the LSI 100-1 notifies the LSI 100-2 of the fact that the preparation of parameter exchange is completed (S2). Also, with a similar procedure, the encountered LSI 100-2 sends a parameter exchange preparation completion code to the LSI 100-1 (S1). In accordance with execution of S1 and S2, with the function of the state machine logic unit 6, the state of the LSI 100-1 changes to state (3).

In state (3), the LSI 100-1 starts parameter exchange. That is, the LSI 100-1 sends parameters such as an operating mode and a checking mechanism to the encountered LSI 100-2 (S4 and S6), and receives parameters sent from the encountered LSI 100-2 (S3 and S5).

When the exchange of a certain number of parameters is completed, the state of the LSI 100-1 changes to state (4) with the function of the state machine logic unit 6. In state (4), the comparator 3 compares the specifications of the parameters of the encountered LSI 100-2, which are received in state (3), with the specifications of the corresponding parameters of the LSI 100-1. As a result of the comparison, when the specifications of the parameters of the LSI 100-1 are higher, the comparator 3 automatically overwrites the specifications of the parameters stored in the parameter FF 2 in order to adjust the specifications of the parameters of the LSI 100-1 to the specifications of the parameters of the encountered LSI 100-2. In contrast, when the specifications of the parameters of the LSI 100-1 are lower, the specifications of the parameters in the parameter FF 2 are not overwritten. The LSI 100-2 similarly compares the parameters and overwrites the specifications of its parameters as needed. As a result, the parameters of the LSIs 100-1 and 100-2 are adjusted to those with lower specifications, and, as a result, the specifications of the parameters of the LSIs 100-1 and 100-2 match each other.

When the operation in state (4) on the certain number of parameters is completed, with the function of the state machine logic unit 6, the state of the LSI 100-1 changes to state (5). In state (5), the LSI 100-1 sends a setting completion code to the encountered LSI 100-2 (S8). Similarly, the encountered LSI 100-2 sends a setting completion code to the LSI 100-1 (S7). When S7 and S8 are executed, with the function of the state machine logic unit 6, the state of the LSI 100-1 changes to state (6). In state (6), the LSI 100-1 terminates the linkup, and the system starts operating. Thereafter, the LSI 100-1 sends information via the sending buffer 4 to the encountered LSI 100-2, and receives information via the receiving buffer 5 from the encountered LSI 100-2. Here, in the linkup state (4), the specifications of the parameters such as the operating mode and the checking mechanism of the LSIs 100-1 and 100-2 are adjusted and match each other, and sending and receiving of the information is performed using the operating mode and the checking mechanism with matching specifications of the parameters. As a result, sending and receiving of information can be normally performed between the LSIs 100-1 and 100-2.

Figure 4:
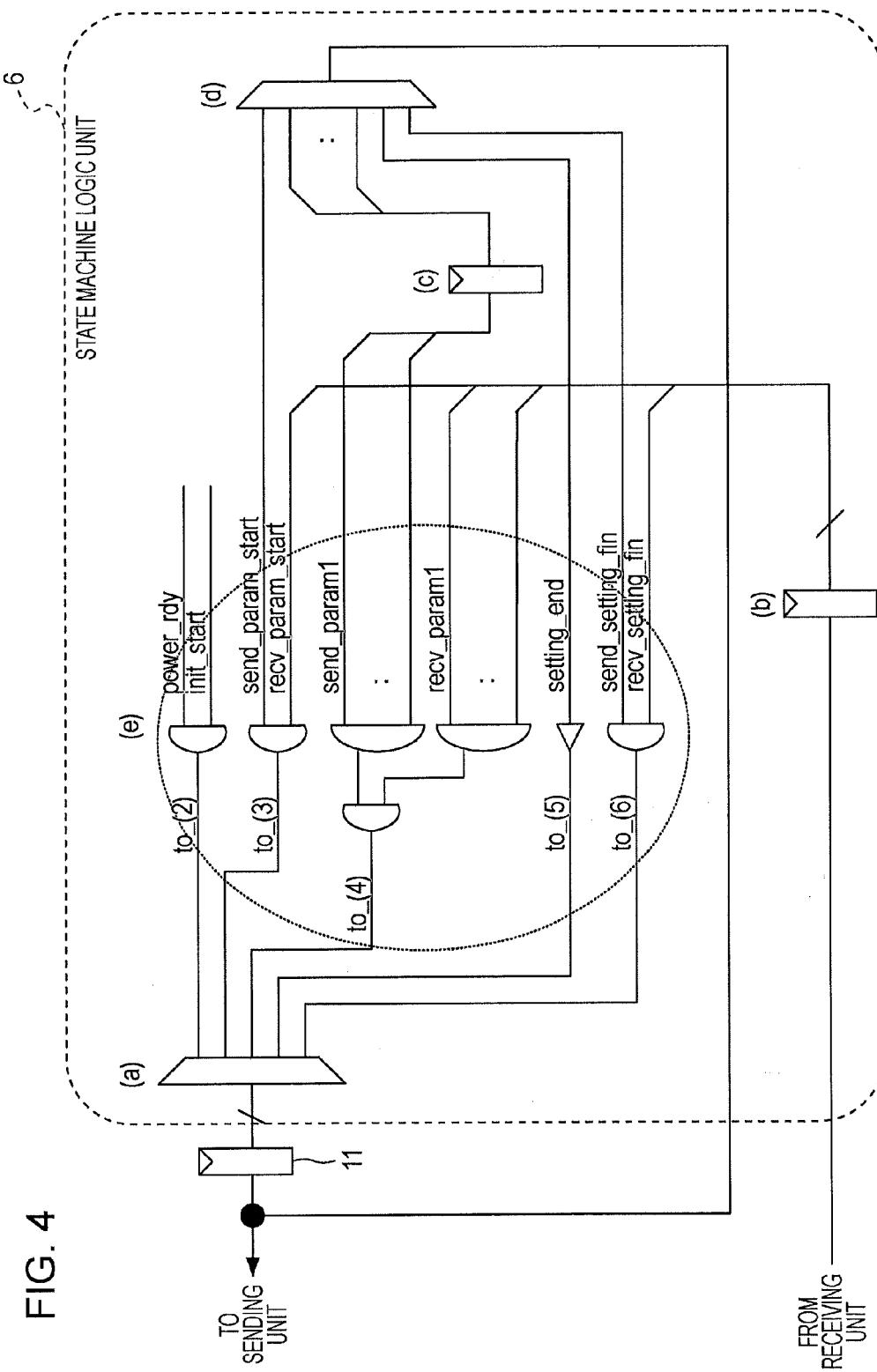
FIG. 4 is a circuit diagram illustrating a structure example of a state machine logic unit illustrated in FIG. 2.

FIG. 4 illustrates an internal structure example of the state machine logic unit 6. Signals illustrated in FIG. 4 will now be described below.

A power_rdy signal is a signal to be asserted when the power of the system is turned on.

An init_start signal is a signal to be asserted when a command to activate the system is given from an external interface, that is, the MMB 200.

A send_param_start signal is a signal to be asserted when a parameter exchange preparation completion code is to be sent.

A recv_param_start signal is a signal to be asserted when a parameter exchange preparation completion code is received.

A send_paramx signal is a signal to be asserted when an x-th parameter is to be sent.

A recv_paramx signal is a signal to be asserted when an x-th parameter is received.

A setting_end signal is an internal automatic setting timing signal and is automatically asserted at a timing at which, for a certain number of parameters, comparison between sent parameters and received parameters and necessary overwriting of its parameters are completed.

A send_setting_fin signal is a signal to be asserted when a setting completion code is to be sent.

A recv_setting_fin signal is a signal to be asserted when a setting completion code is received.

The state FF 11 illustrated in FIG. 4 stores information or a code indicating the current execution state. An encoder (a) generates the next code (state) and writes the next code (state) in the state FF 11. A holding FF (b) holds the number of received parameters. A holding FF (c) holds the number of sent parameters. An encoder (d) generates, from the code (state) stored in the state FF 11, a corresponding signal. A logic circuit (e) receives outputs from the holding FF (b), the holding FF (c), and the encoder (d), and generates a signal for changing the code indicating the state stored in the state FF 11.

The state machine logic unit 6 that is illustrated in FIG. 4 and that has the foregoing structure operates in the following manner. An initial value of the state FF 11 is "0". This state indicates that no linkup operation is being performed. Next, when a condition to change the state to state (2) is satisfied, with the logic circuit (e), a code indicating state (2) is written into the state FF 11. On the basis of the code, the encoder 12, the AND elements 13, 14, and 15, and the OR element 16 illustrated in FIG. 2 pass corresponding information to the sending unit 18. That is, in this case, the encoder 12 asserts output (2) indicating state (2). In response to assertion of output (2), the AND element 13 outputs a parameter exchange preparation completion code. As a result, the parameter exchange preparation completion code is sent via the sending unit 18 to the encountered LSI 100-2.

Similarly, when sending and receiving of the parameter exchange preparation completion code is performed, with the logic circuit (e), a code indicating state (3) is written into the state FF 11. On the basis of the code, the encoder 12 asserts output (3) indicating state (3). In response to assertion of output (3), the AND element 14 outputs the parameters stored in the parameter FF 2. As a result, the parameters are sent via the sending unit 18 to the encountered LSI 100-2. Here, the number of outputs (3) of the encoder 12 is equivalent to a predetermined number of parameters to be exchanged. The predetermined number of outputs (3) are individually and sequentially asserted. Similarly, the number of AND elements 14 is equivalent to the predetermined number. In response to sequential and individual assertion of the predetermined number of outputs (3), the AND elements 14 sequentially output corresponding parameters stored in the parameter FF 2. Also in this case, the encoder 12 refers to the holding FF (c) in the state machine logic unit 6. That is, the encoder 12 reads, from the holding FF (c), the number of parameters that have been currently sent, and, in accordance with the read result, asserts the corresponding output(s) among the predetermined number of outputs (3). As a result, the corresponding parameter(s) is/are output from the parameter FF 2 to the encountered LSI 100-2.

When exchange of the predetermined number of parameters is completed, with the logic circuit (e), a code indicating state (4) is written into the state FF 11. On the basis of the code, the encoder 12 asserts output (4) indicating state (4). In response to assertion of output (4), for the predetermined number of parameters, the comparator 3 compares the specifications of the parameters between the sending and receiving sides, and overwrites the specifications of the parameters in the parameter FF 2 as needed.

When comparison of the parameters and, if necessary, overwriting of the specifications of the parameters are completed, an internal automatic setting timing signal is asserted, and accordingly, a code indicating state (5) is written into the state FF 11. On the basis of the code indicating state (5), the encoder 12 asserts output (5) indicating state (5). In response to the output (5) indicating state (5), the AND element 15 outputs a setting completion code. As a result, the setting completion code is sent via the sending unit 18 to the encountered LSI 100-2.

When sending and receiving of the setting completion code is performed, with the logic circuit (e), a code indicating state (6) is written into the state FF 11. On the basis of the code indicating state (6), the encoder 12 asserts output (6) indicating state (6). As a result, the LSI 100-1 terminates the linkup, and enters a normal operating state.

In linkup, handshaking is sequentially performed when sending and receiving signals. When sending and receiving of all signals is normally completed, the linkup is successfully completed, and the system enters a normal operating state.

In this manner, the state machine logic unit 6 generates a code indicating the next state from information indicating the state of the LSI 100-1 and received information indicating the state of the encountered LSI 100-2, and controls the progression of the transition of the state of the LSI 100-1. With the function of the state machine logic unit 6 described above, the state of the LSI 100-1 in linkup is sequentially changed, and next information to be sent to the encountered LSI 100-2 is selected in accordance with the transition of the state of the LSI 100-1. In this manner, handshaking is performed with the encountered LSI 100-2.

When parameters are exchanged with the encountered LSI 100-2, the MMB 200 is enabled to perform, by using the comparator 3, comparison between the parameters of the LSI 100-1 set in the parameter FF 2 and the received parameters. That is, it becomes possible to compare the specifications of the parameters of the LSI 100-1 with the specifications of the parameters of the encountered LSI 100-2. As described above, comparison of the specifications of the parameters is performed using the comparator 3. Using hardware, the parameters stored in the parameter FF 2 are automatically overwritten with the parameters with lower specifications of the parameters.

Figure 5:
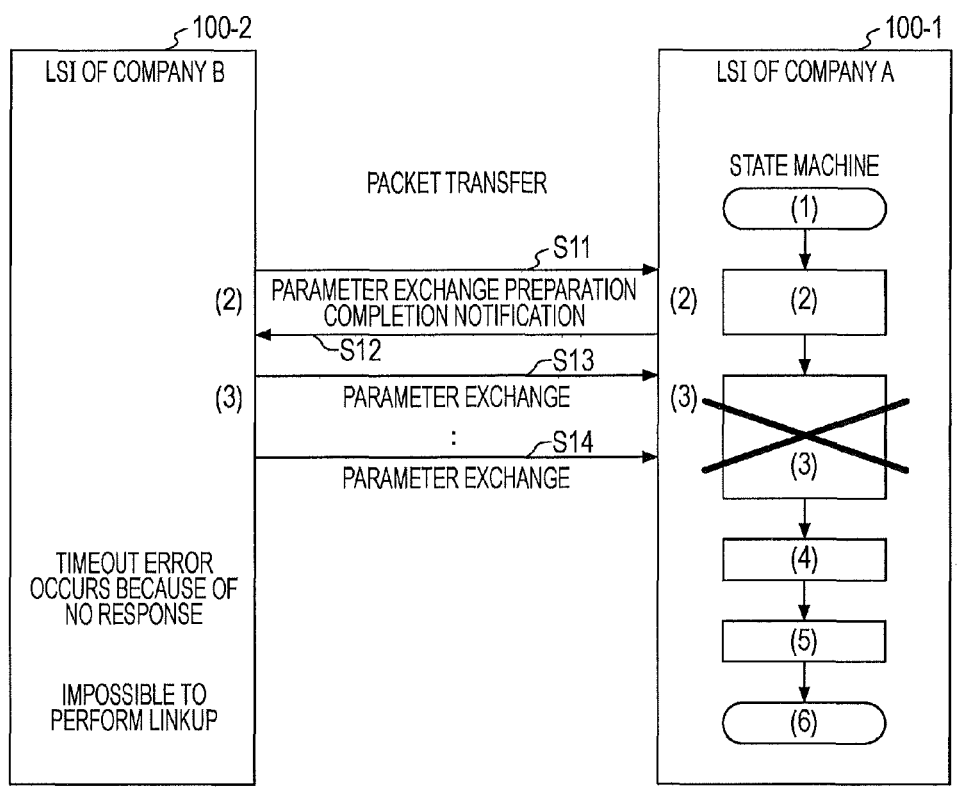
FIG. 5 is an illustration (part one) for describing problems with a linkup operation.

Here, for example, when the transition of the state illustrated in FIG. 3 from state (2) to state (5) is unsuccessful, linkup is not completed. Linkup is executed by sequentially changing the state, as described above, with the function of the state machine logic unit 6 serving as hardware. As described above, when the transition of the state in linkup is unsuccessful, for example, instead of using the function of the state machine logic unit 6 serving as hardware, the system administrator may manually perform linkup. However, as described above, when the system includes the LSI 100-2 of the different company B, the method of manually linking up the LSI 100-2 of the different company B may be unknown. In such a case, it may be difficult to perform linkup. When linkup is not performed, it becomes difficult to perform debugging, which is performed after the linkup. For example, FIG. 5 illustrates the case in which state (3) is not completed in linkup. In the case of FIG. 5, parameter exchange preparation completion codes are sent and received between the two sides (S11 and S12), and parameters are sent from the encountered LSI 100-2 (S13 and S14). However, due to a failure of the linkup function of the LSI 100-1, no parameters are sent from the LSI 100-1. As a result, the encountered LSI 100-2 fails to complete the parameter exchange state. A timeout error occurs, and linkup will not be completed.

Figure 6:
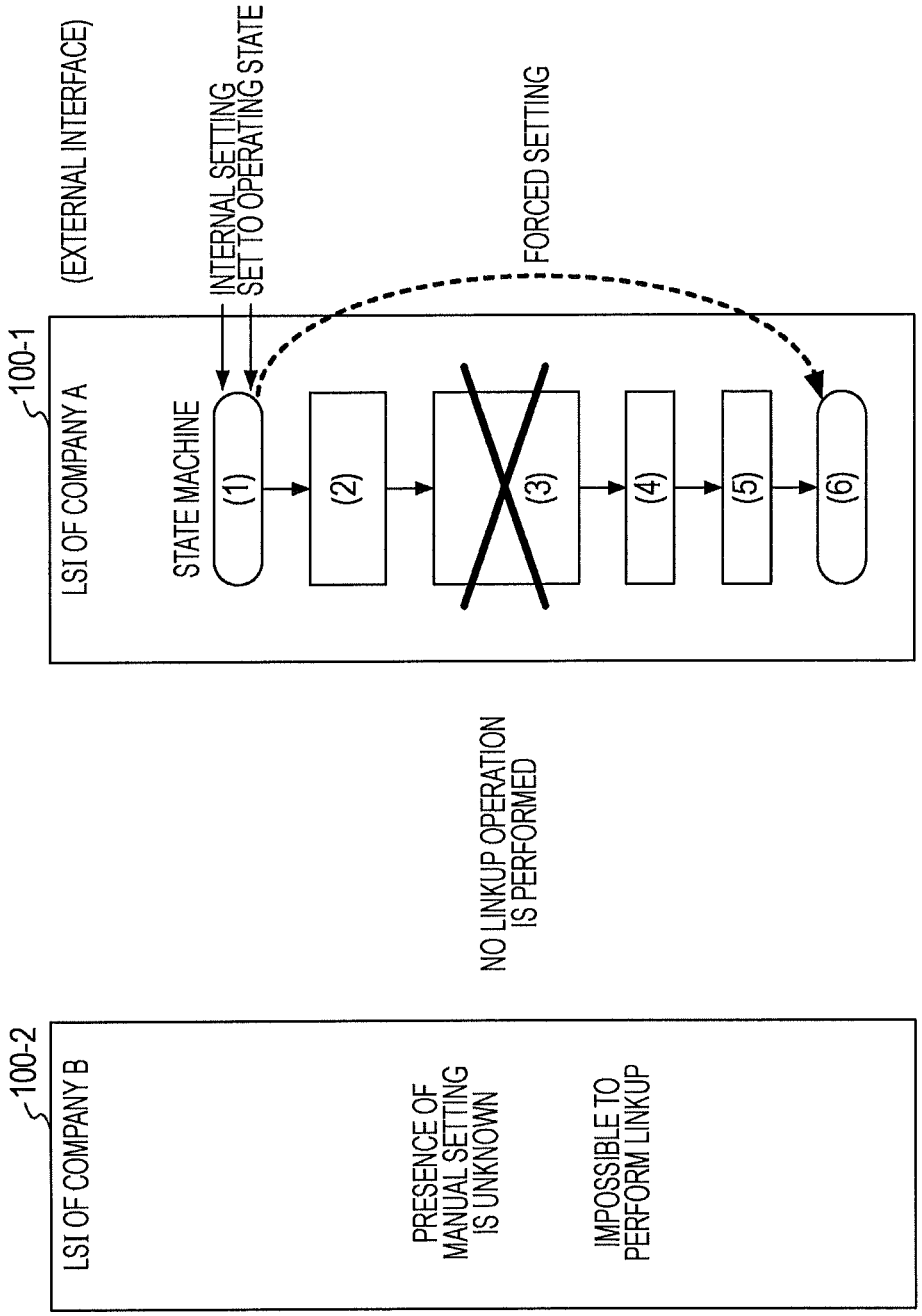
FIG. 6 is an illustration (part two) for describing problems with a linkup operation.

FIG. 6 illustrates a method of overcoming the problem when linkup is not performed with the encountered LSI 100-2 due to a failure of the linkup function of the LSI 100-1, as described above, by overwriting, using the MMB 200, the parameters of the LSI 100-1 from the outside. In this case, if the specifications of the parameters of the encountered LSI 100-2 are known, the specifications of the parameters of the LSI 100-1 can be adjusted to the specifications of the parameters of the encountered LSI 100-2. As a result, the specifications of the parameters of the LSIs 100-1 and 100-2 match each other. With a manual operation, the LSI 100-1 can be forced to set to an operating state (i.e., state (6)). However, with this method, the encountered LSI 100-2 is not capable to perform linkup with the partner LSI 100-1. In such a case, even when linkup is not actually performed with the partner LSI 100-1, it is only necessary to cause the encountered LSI 100-2 to recognize that "linkup is completed" and to set the LSI 100-2 to an operating state. However, the encountered LSI 100-2 is a product of another company, and, when a manual linkup method therefor is unknown, it may be difficult to cause the encountered LSI 100-2 to recognize that "linkup is completed" without actually performing linkup.

In the case where linkup is not normally performed as above, it is necessary to perform debugging. In order to perform debugging, there is a method of storing an operation history of the state machine logic unit 6 serving as hardware in the RAM 7 (or a flip-flop). However, with this method, the operation of the state machine logic unit 6 is to be estimated on the basis of the history (i.e., log) stored in the RAM 7, and the estimation takes time. Because of the estimation, the actual operation of the state machine logic unit 6 may not be accurately detected. With this method, because the entire history of steps in a linkup operation is stored, a large capacity of the RAM 7 is necessary for the storage.

According to an embodiment described below, even in the case where the system includes an LSI of another company as described above, it becomes possible to easily generate a linked up state. As a result, debugging after the linkup can be certainly performed. According to an embodiment, even in the case where linkup is not normally performed, the operation of the state machine logic unit 6 can be certainly detected, and a problem causing the failure can be easily detected. As a result, debugging for solving the problem can be easily performed. It becomes unnecessary to provide a RAM with a large capacity for storing the entire history of all steps in the operation of the state machine logic unit 6.

A first method of the embodiment will be described. In the first method of the embodiment, at the time of parameter exchange in linkup, the LSI 100-1 sends parameters sent from the encountered LSI 100-2 to the encountered LSI 100-2 without changing them (hereinafter this will be referred to as "loopback"). With the loopback operation, the encountered LSI 100-2 receives the parameters sent by itself (the encountered LSI 100-2). However, the encountered LSI 100-2 recognizes the received parameters of its own as parameters included in the partner LSI 100-1, which are obtained by performing the parameter exchange. In this case, the encountered LSI 100-2 recognizes that its parameters have the same specifications as those of the parameters of the partner LSI 100-1. Therefore, the encountered LSI 100-2 does not overwrite its parameters. As a result, actually no parameter exchange is performed; that is, the LSI 100-1 does not send its parameters to the encountered LSI 100-2, and the encountered LSI-2 is caused to recognize that the parameter exchange has been performed. Also, the specifications of the parameters of the encountered LSI 100-2 are set as the specifications of the parameters of the LSI 100-1. As a result, the specifications of the parameters of the two LSIs 100-1 and 100-2 match each other. That is, the parameters of the LSIs 100-1 and 100-2 have the same specifications as those of the parameters originally included in the encountered LSI 100-2.

Figure 7:
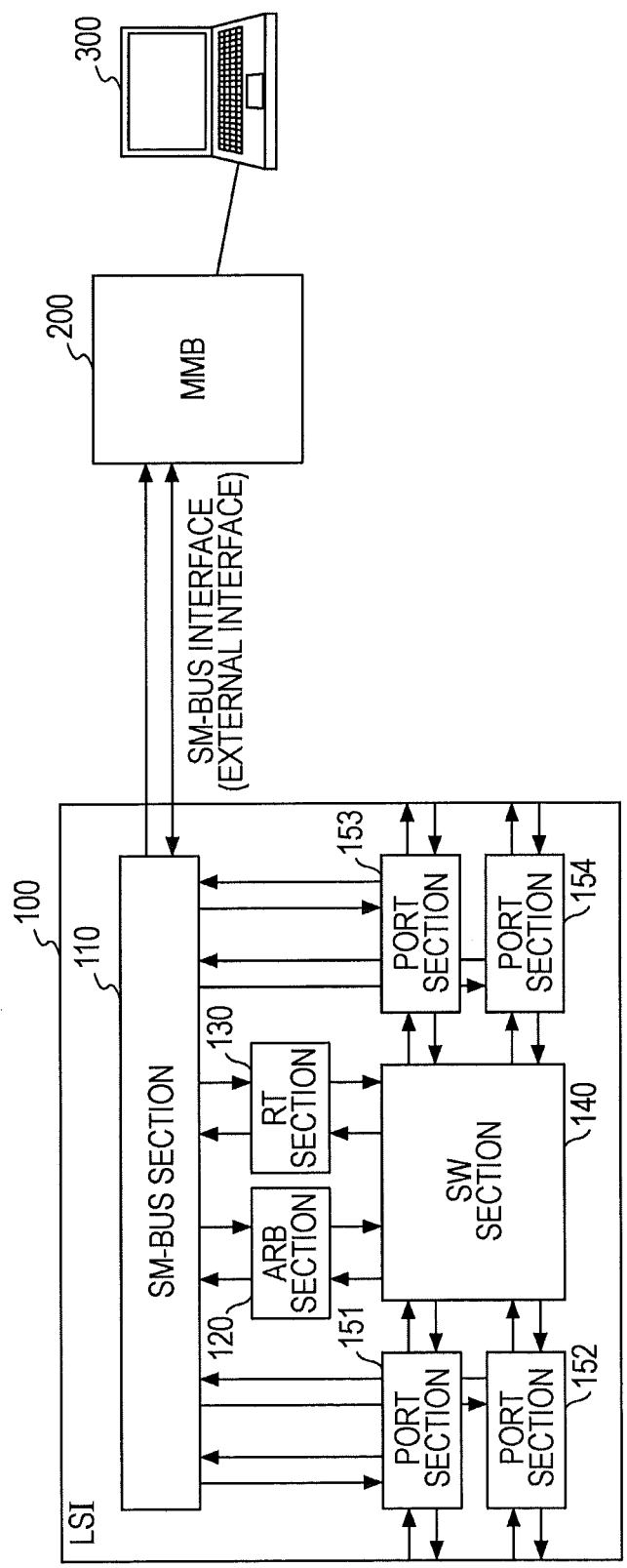
FIG. 7 illustrates a structure example of an LSI of an embodiment.
Figure 8:
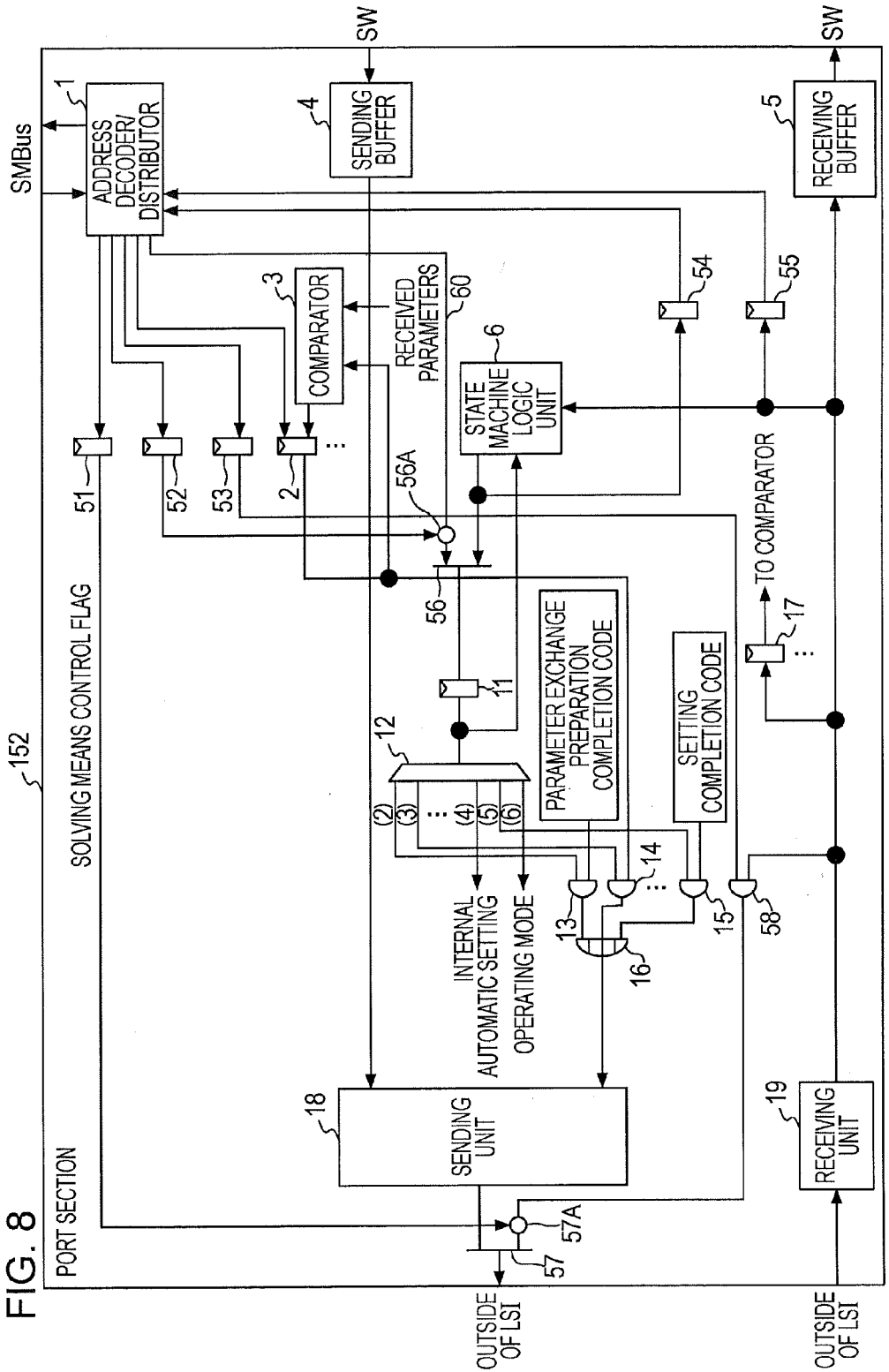
FIG. 8 illustrates the internal structure of a port section included in the LSI illustrated in FIG. 7.

The first method of the embodiment will be described in detail below. FIG. 7 illustrates the structure of the LSI 100 that realizes the first method and a second method, which will be described later, of the embodiment. FIG. 8 illustrates a structure example of the port section 152 of the LSI 100. The block structure of the LSI 100 of the embodiment illustrated in FIG. 7 is similar to the structure of the reference example illustrated in FIG. 1, and an overlapping description will be omitted. In the structure illustrated in FIG. 8, a description of portions similar to the structure of the port section 152 of the LSI of the reference example described above with FIG. 2 will be omitted.

To realize the first method of the embodiment, a selector 57 is provided to send a parameter exchange preparation completion code, parameters, and a setting completion code from an encountered LSI back to the encountered LSI without changing them (that is, loopback described above). The selector 57 is provided on the output terminal side of the sending unit 18. The selector 57 selects an output signal of an AND element 58 when a signal applied to a selection terminal 57A is asserted. Therefore, when a signal applied to the selection terminal 57A is asserted, a signal received from the encountered LSI via the AND element 58 and the receiving unit 19 is sent as it is to the encountered LSI (i.e., loopback). In contrast, when a signal applied to the selection terminal 57A is not asserted, the selector 57 selects an output signal of the sending unit 18. As a result, as in the normal case, an output signal of the sending unit 18 is sent to the encountered LSI.

The AND element 58 is provided in the port section 152 of the LSI 100 of the embodiment. The AND element 58 closes a channel from the receiving unit 19 to the selector 57 until the setting of parameters of the LSI 100 is completed by the MMB 200. When the setting of parameters of the LSI 100 is completed by the MMB 200, the AND element 58 opens the channel from the receiving unit 19 to the selector 57. As a result, when a signal applied to the selection terminal 57A of the selector 57 is asserted, a signal received from the encountered LSI is sent as it is via the selector 57 to the encountered LSI (i.e., loopback). The operation of closing and opening the channel to the selector 57 by using the AND element 58 is performed by the MMB 200 via the external interface.

That is, with the first method (may also be referred to as "forced linkup") of the embodiment, a channel for sending a signal received at the receiving unit 19 from the encountered LSI, via the AND element 58 and the selector 57 to the encountered LSI without changing the signal (i.e., loopback) is provided. As a result, as described above, even when no parameter exchange is actually performed, the encountered LSI can be caused to recognize that parameter exchange has been performed. Regarding the parameters of the LSI 100, by forcedly writing a code into the state FF 11 from the external interface (i.e., by using the MMB 200), the state of the LSI 100 is set. As a result, even when no parameter exchange is actually performed, parameters with the same specifications as those of the parameters of the encountered LSI are set in the state FF 11 of the LSI 100. To perform this operation, a signal channel 60 for writing a code into the state FF 11 from the external interface via the address decoder/distributor 1 is provided. Also, a selector 56 is provided. With the selector 56, one of the writing into the state FF 11 by using the signal channel 60 and the normal writing into the state FF 11 by using the state machine logic unit 6 is selected.

Furthermore, in this embodiment, a loopback mode FF 51, a manual mode FF 52, and a setting completion FF 53 are provided. The MMB 200 sets a control flag in the loopback mode FF 51 via the external interface. With the control flag, a signal applied to the selection terminal 57A of the selector 57 is asserted, and loopback is performed. The MMB 200 sets a control flag in the manual mode FF 52 via the external interface. With the control flag, a signal applied to a selection terminal 56A of the selector 56 is asserted, and unlike the normal case, the MMB 200 sets the code in the state FF 11 via the external interface and the signal channel 60. The MMB 200 sets a control flag in the setting completion FF 53 via the external interface. With the control flag, the AND element 58 is opened, and loopback via the selector 57 is performed.

In this embodiment, a receiving state holding FF 55 is provided. With this receiving state holding FF 55, the MMB 200 can detect a signal received from the encountered LSI via the external interface.

Next, the procedure of the first method (i.e., forced linkup) of the embodiment will be described. With the procedure described below, a linkup state is generated, and an LSI and its encountered LSI are individually caused to enter an operating state. With this procedure, as described above, the encountered LSI recognizes that parameter exchange has been normally performed. As a result, seemingly normal linkup is completed. That is, automatic linkup is completed by a state machine logic unit that is hardware included in the encountered LSI. Therefore, it is unnecessary to manually link up the encountered LSI. Even if the encountered LSI is a product of another company and the method of manually linking up the encountered LSI is unknown, no problem occurs.

(i) The administrator turns on the power of a system including an LSI 100 and its encountered LSI.

(ii) The MMB 200 performs internal setting of the LSI 100 via the external interface. That is, the MMB 200 sets parameters having the same specifications as those of the encountered LSI via the external interface.

(iii) Even when a parameter exchange preparation completion code is received from the encountered LSI, the AND element 58 is maintained in a closed state until the operation of (ii) is completed. When the operation of (ii) is completed, the AND element 58 is opened, and a parameter exchange preparation completion code received from the encountered LSI is sent as it is via the AND element 58 and the selector 57 to the encountered LSI (i.e., loopback).

(iv) Thereafter, parameters received from the encountered LSI are continuously sent as they are via the AND element 58 and the selector 57 to the encountered LSI (i.e., loopback).

(v) Thereafter, a setting completion code received from the encountered LSI is continuously sent as it is via the AND element 58 and the selector 57 to the encountered LSI (i.e., loopback). As a result, the encountered LSI normally completes the linkup in an automatic mode and enters an operating state.

Also, in the above operation of (i), the MMB 200 sets, via the external interface, the specifications of the parameters in the parameter FF 2 of the LSI 100 to the same specifications as those of parameters of the encountered LSI. Also, the MMB 200 forcedly sets, via the external interface, a setting completion code in the state FF 11. Therefore, the LSI 100 also enters an operating state. As a result, communication is normally performed between the LSI 100 and the encountered LSI, and a normal operation starts.

Figure 9:
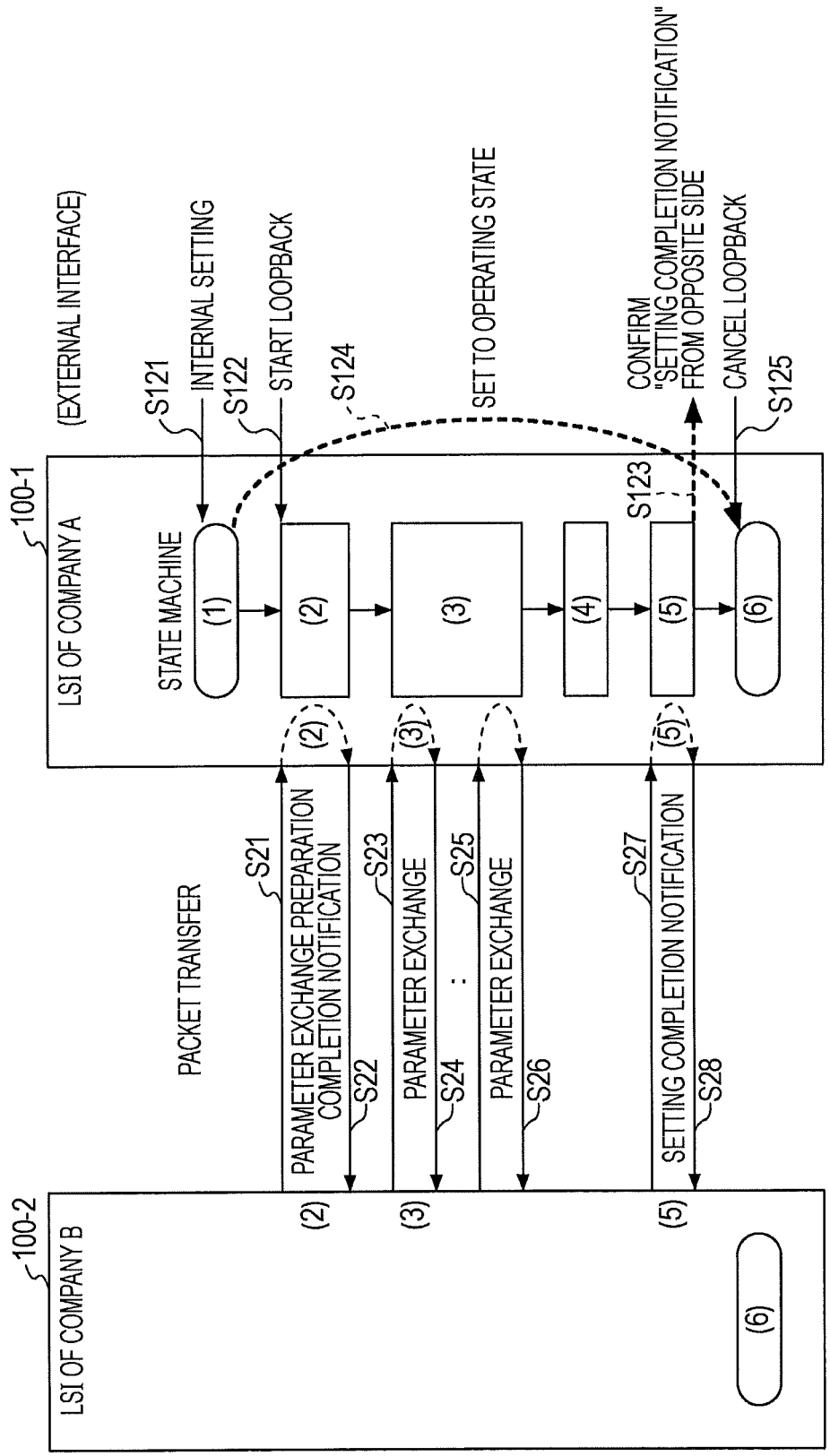
FIG. 9 is an illustration (part one) for describing a first method of the embodiment.

Next, with reference to FIGS. 8, 9, and 10, the flow of the first method of the embodiment, that is, the operation of the forced linkup, will be described. In FIG. 9, (1) to (6) indicate states (1) to (6) described above with reference to FIG. 3.

Figure 10:
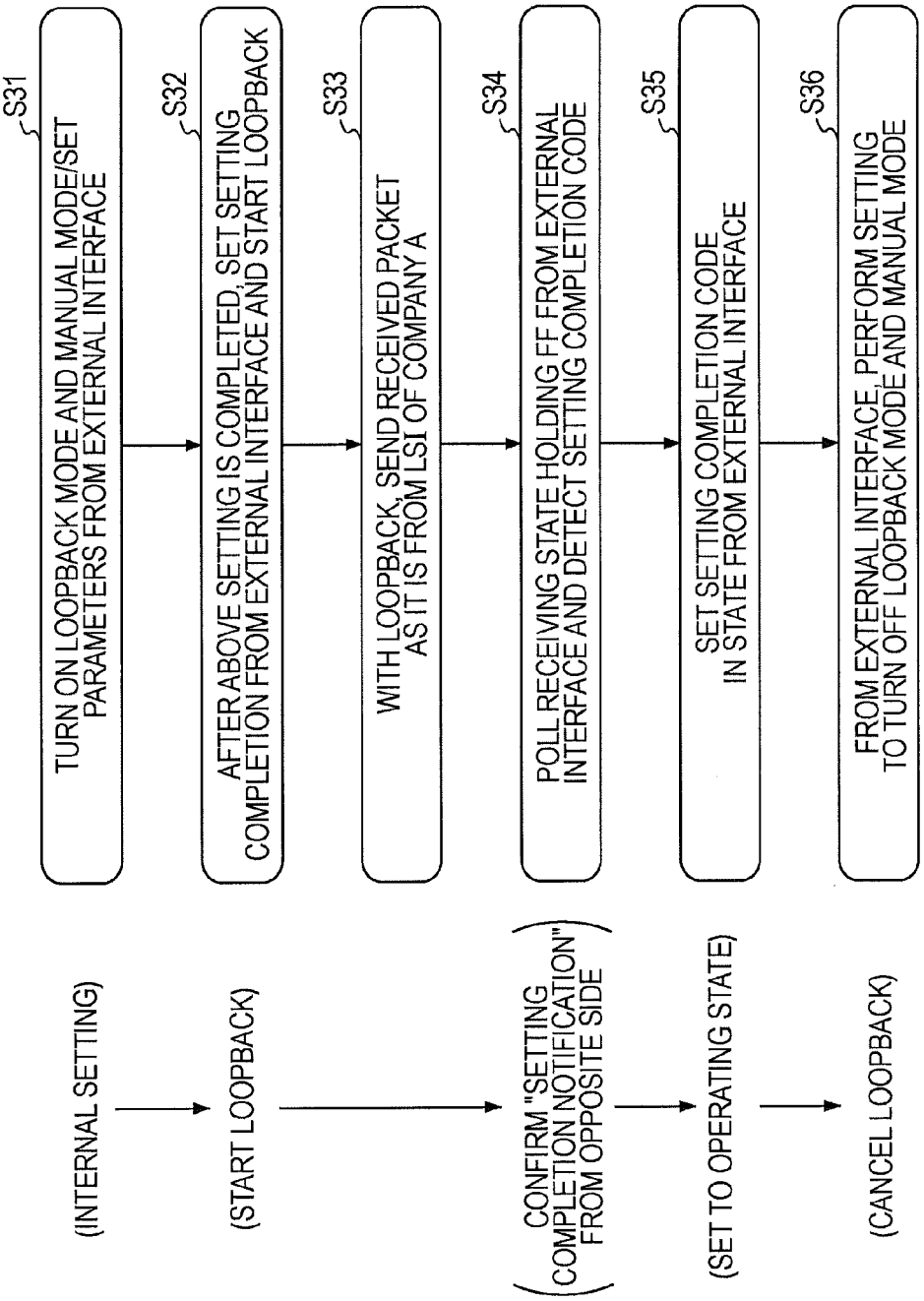
FIG. 10 is an illustration (part two) for describing the first method of the embodiment.

In step S31 in FIG. 10, a control flag is set in each of the loopback mode FF 51 and the manual mode FF 52. As a result, the setting of the code in the state FF 11 is performed not from the state machine logic unit 6 as in the normal case, but from the MMB 200 via the external interface. However, at this stage, no control flag has been set yet in the setting completion FF 53. The AND element 58 is closed, and the loopback is suppressed. In this state, the internal setting is performed by the MMB 200 via the external interface (S121 in FIG. 9). That is, the MMB 200 sets parameters having the same specifications as those of parameters of the encountered LSI 100-2 in the parameter FF 2 via the external interface.

After the internal setting is completed, the MMB 200 sets a control flag in the setting completion FF 53 via the external interface, and the AND element 58 is opened. As a result, the loopback is started (S32 in FIG. 10 and S122 in FIG. 9). As a result, a signal sent from the encountered LSI 100-2 is sent as it is via the AND element 58 and the selector 57 to the encountered LSI (S33). That is, referring to FIG. 9, a parameter exchange preparation completion code received from the encountered LSI 100-2 is sent to the encountered LSI 100-2 (S21 and S22). Thereafter, continuously "seeming parameter exchange" is performed (S23, S24, S25, and S26). This "seeming parameter exchange" indicates, as described above, the operation in which parameters sent from the encountered LSI 100-2 return to the encountered LSI 100-2 via the LSI 100-1 without being changed. That is, this is parameter exchange seemingly for the encountered LSI 100-2.

In step S33, when the "seeming parameter exchange" in which, by performing loopback, all the parameters sent from the encountered LSI 100-2 return to the encountered LSI 100-2 via the LSI 100-1 is completed, the flow proceeds to step S34. In step S34, due to the completion of the seeming parameter exchange, the encountered LSI 100-2 determines that the parameter exchange is completed, and sends a setting completion code (S27 in FIG. 9). By polling the receiving state holding FF 55, the MMB 200 obtains the setting completion code via the external interface (S123). With the loopback, the setting completion code is also sent to the encountered LSI 100-1 (S28).

In step S35, the MMB 200 sets the setting completion code in the state FF 11 via the external interface and the selector 56. As a result, the LSI 100-1 enters an operating state (6) (S124).

At last in step S36, the administrator deletes the control flags set in step S31 in the loopback mode FF 51 and the manual mode FF 52 by using the MMB 200 via the external interface. As a result, the selector 57 selects the output from the sending unit 18, and the selector 56 selects the output from the state machine logic unit 6. Accordingly, the state becomes a normal state (S125).

With the first method (i.e., forced linkup) of the embodiment, the following advantages can be expected. That is, even when the method of linking up the LSI 100-2 of the different company B is unknown, a state in which linkup is completed can be generated, and thereafter a debugging operation can be performed. In the first method of the embodiment, it is only necessary to operate the LSI 100-1 of company A in order to generate a state in which linkup is completed. Thus, program generation, modification, and the like in the MMB 200, which is necessary for realizing the method, can be easily performed. With this method, the LSI 100-2 of the different company B can enter an operating state by performing a normal procedure. Therefore, the risk of causing a failure in the LSI 100-2 of the different company B can be reduced.

Figure 11:
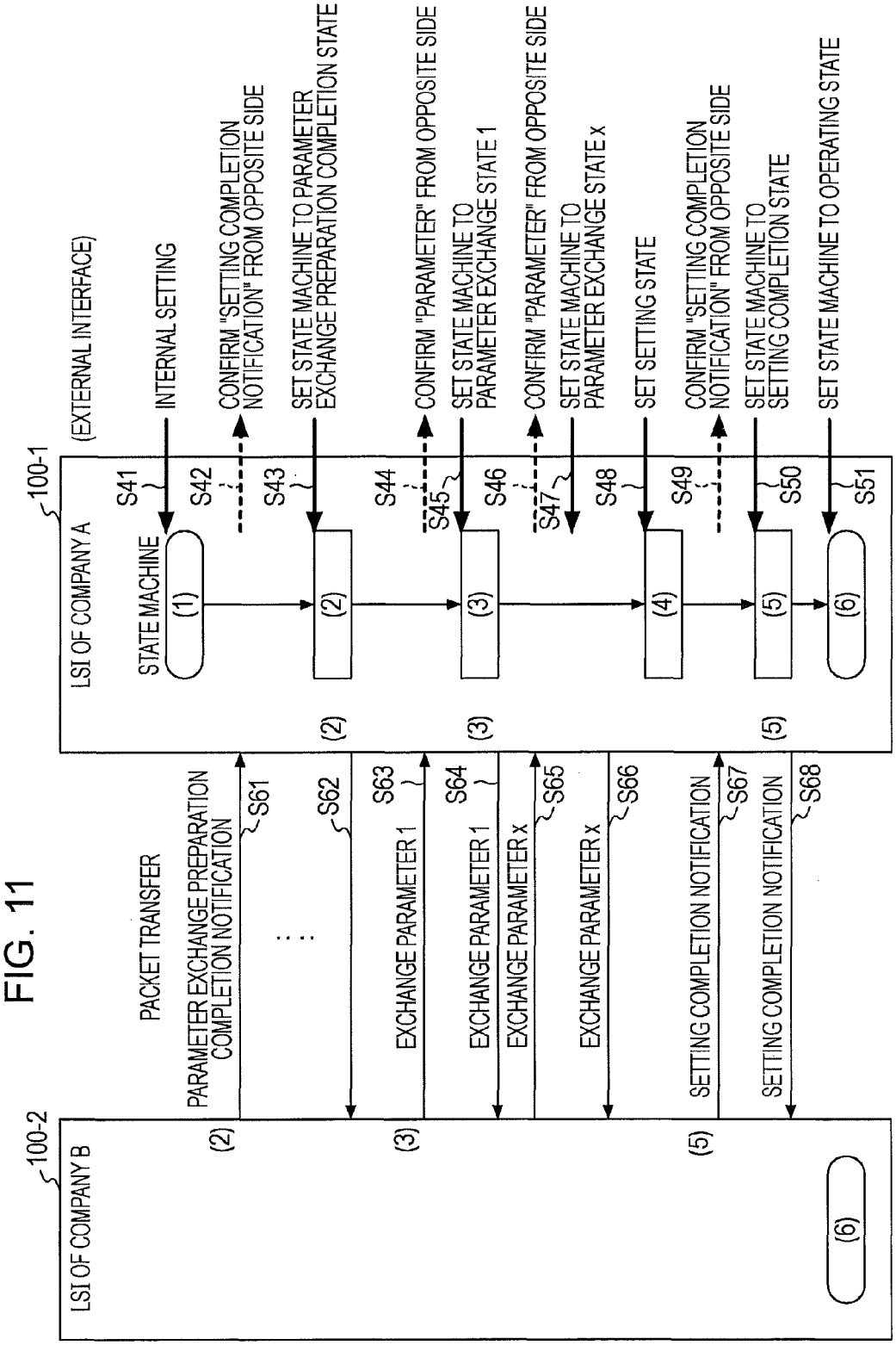
FIG. 11 is an illustration (part one) for describing a second method of the embodiment.
Figure 12:
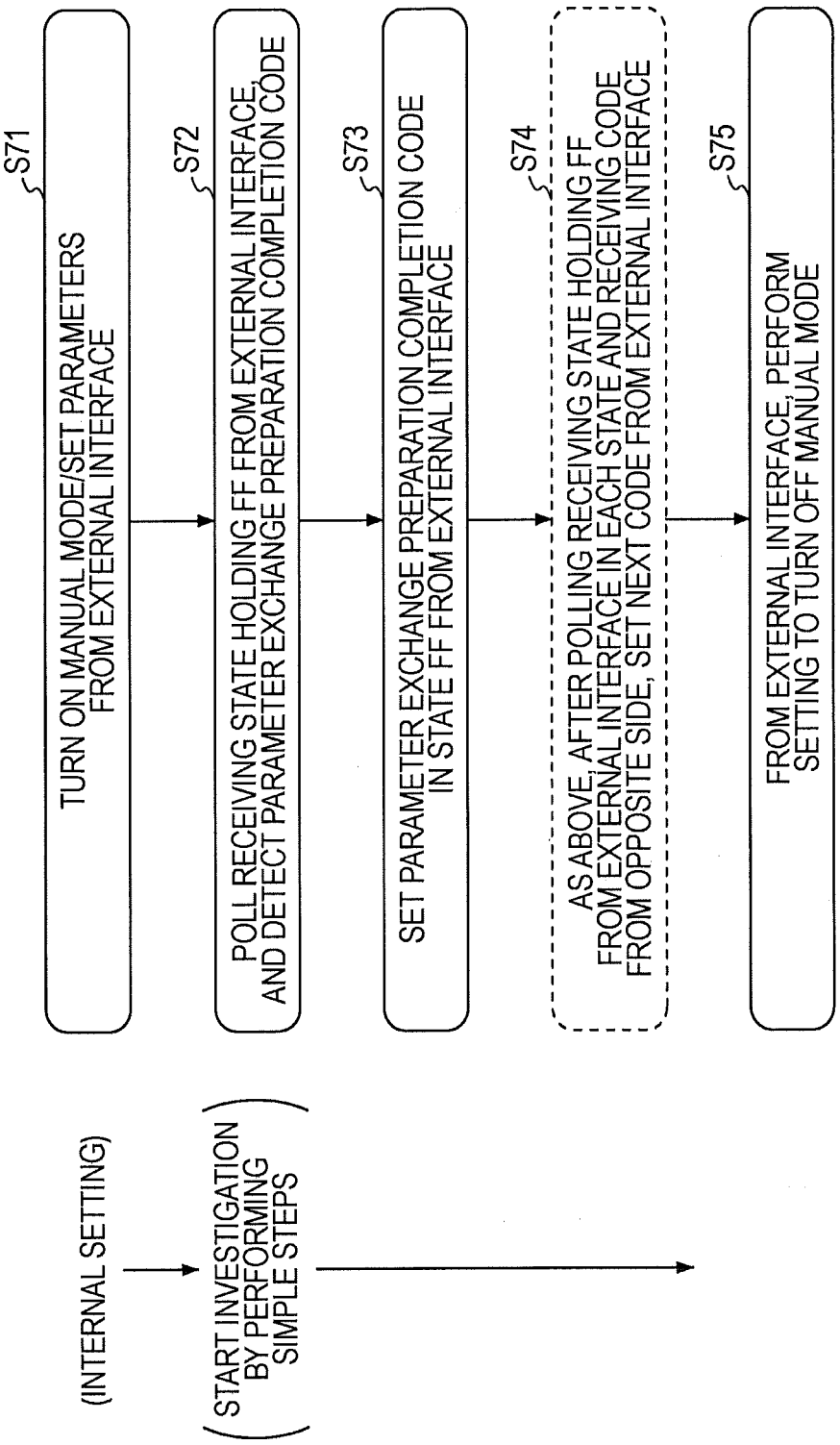
FIG. 12 is an illustration (part two) for describing the second method of the embodiment.

Referring now to FIGS. 11 and 12, the second method (also referred to as "simple steps") of the embodiment will be described.

In a system in which the LSI 100-1 of company A and the LSI 100-2 of the different company B are mutually connected, the case in which a failure occurs in the linkup function of the LSI 100-1 of company A is assumed. In this case, the simple steps can be performed to facilitate the debugging of the LSI 100-1 of company A. With the second method of the embodiment, besides the forced linkup, the simple steps are performed, thereby easily performing debugging and promptly finding out the cause of the failure.

As described above, since the state machine logic unit 6 is hardware, the state machine logic unit 6 automatically executes the operation of sequentially changing the state of the LSI 100-1. In the second method of the embodiment, using the MMB 200 via the external interface, the administrator manually administers the progression of the transition of the state by using the state machine logic unit 6. With the selector 56, the selection terminal 56A, and the signal channel 60, using the MMB 200 via the external interface, the administrator can administer the progression of the transition of the state by using the state machine logic unit 6. In the case of the simple steps, using the MMB 200 via the external interface, the administrator also provides a structure that can overwrite the details held in the holding FF (c) of the state machine logic unit 6 illustrated in FIG. 4. As a result, the administrator can administer the sending timing of each of parameters in the parameter exchange.

Furthermore in the second method of the embodiment, in order to monitor a code indicating the state of the encountered LSI 100-2, which is received from the encountered LSI 100-2, the receiving state holding FF 55, which is illustrated in FIG. 8, is provided. In a normal operation case, that is, in a state where no control flag is set in the manual mode FF 52, the state machine logic unit 6 writes a code indicating the state in the state FF 11. Therefore, as illustrated in FIG. 2, the operation of the state machine logic unit 6 can be detected by reading the code in the state FF 11. However, in the case of the simple steps, a control flag is set in the manual mode FF 52, and the selector 56 selects the signal channel 60. Therefore, the code in the state FF 11 is set not by the state machine logic unit 6, but by the MMB 200 via the external interface. Thus, in the case of the second method of the embodiment, particularly to monitor the operation of the state machine logic unit 6, a hardware operating state holding FF 54 (illustrated in FIG. 8) that holds the output from the state machine logic unit 6 to the state FF 11 is provided. As a result, by polling the receiving state holding FF 55, the MMB 200 can monitor the state of the encountered LSI 100-2 via the external interface. Similarly, by polling the hardware operating state holding FF 54, the MMB 200 can monitor the operation of the state machine logic unit 6 via the external interface. Therefore, information for debugging can be effectively collected.

In the case of the simple steps, as described above, the MMB 200 sets the code in the state FF 11 via the external interface and sets the code in the holding FF (c) in the state machine logic unit 6. In this way, the administrator administers the transition of the state of the LSI 100-1. In this case, furthermore, a timer monitoring function and the like of the encountered LSI 100-2 are invalidated; otherwise, the following failure may occur. That is, as described above, when the transition of the state of the LSI 100-1 is delayed as a result of the administrator's administration of the transition of the state of the LSI 100-1, the encountered LSI 100-2 is notified of the delayed state. As a result, it is assumed that the encountered LSI 100-2 does not receive the code indicating the state of the encountered LSI 100-1 within a predetermined time. A timeout error occurs because of the timer monitoring function and the like.

As described above, when debugging for overcoming a failure of the linkup function of the LSI 100-1 is to be performed, instead of an LSI of the different company B, another LSI of company A may be connected as the encountered LSI 100-2. By connecting another LSI of company A as the encountered LSI 100-2, the above operation of invalidating the timer monitoring function and the like can be easily performed.

Referring to FIGS. 11 and 12, the flow of the operation of the simple steps will be described. In step S71 of FIG. 12, the administrator sets a control flag in the manual mode FF 52 by using the MMB 200 via the external interface. As a result, the selector 56 selects the signal channel 60. In this state, the administrator sets parameters having the same specifications as those of parameters of the encountered LSI 100-2 in the parameter FF 2 by using the MMB 200 via the external interface (S41 in FIG. 11).

Next in step S72, the administrator obtains a code indicating the state of the encountered LSI 100-2, which is received from the encountered LSI 100-2, by using the MMB 200 via the external interface and the receiving state holding FF 55. The administrator obtains a parameter exchange preparation completion code sent from the encountered LSI 100-2 and received by the LSI 100-1 (S61 and S42 in FIG. 11).

Next in step S73, the administrator sets the parameter exchange preparation completion state (2) in the state FF 11 by using the MMB 200 via the external interface (S43 in FIG. 11). In response to this parameter exchange preparation completion state (2) set in the state FF 11, the encoder 12 generates a signal for outputting the parameter exchange preparation completion code to the encountered LSI 100-2 (S62 in FIG. 11)

Next in step S74, the administrator obtains a parameter 1 of the encountered LSI 100-2, which is received from the encountered LSI 100-2, by using the MMB 200 via the external interface and the receiving state holding FF 55 (S63 and S44 in FIG. 11). The parameter 1 indicates the first parameter (same as above in the following description). In response to this, the administrator sets a code indicating the parameter exchange state (3) in the state FF 11 by using the MMB 200 via the external interface. The encoder 12 reads the code written in the state FF 11 and generates a signal for taking out the parameter 1 from the parameter FF 2 and sending the parameter 1. In accordance with the generated signal, the parameter 1 is sent from a corresponding one of the AND elements 14 to the encountered LSI 100-2 (S64).

With similar steps, the administrator obtains a parameter x of the encountered LSI 100-2, which is received from the encountered LSI 100-2, by using the MMB 200 via the external interface and the receiving state holding FF 55 (S65 and S46 in FIG. 11). In response to this obtained parameter x, the administrator writes information indicating that the number of sent parameters is x−1 in the holding FF (c) in the state machine logic unit 6 by using the MMB 200 via the external interface (S47). The encoder 12 reads the information indicating that the number of sent parameters is x−1, which is written in the holding FF (c), and generates a signal for taking out the parameter x from the parameter FF 2 and sending the parameter x. In accordance with the generated signal, the parameter x is sent from a corresponding one of the AND elements 14 to the encountered LSI 100-2 (S66).

When exchange of a predetermined number of parameters is completed as above, the administrator sets the parameter automatic setting state (4) in the state FF 11 by using the MMB 200 via the external interface and the receiving state holding FF 55 (S48). The encoder 12 reads the automatic setting state and activates the internal automatic setting operation. The internal automatic setting operation is, as described above, the operation in which the comparator 3 compares the specifications of the parameters of the LSI with those of its encountered LSI and overwriting the specifications of the parameters of the LSI set in the parameter FF 2 as needed.

Next, the administrator obtains a setting completion code sent by the encountered LSI 100-2 and received by the LSI 100-1 by using the MMB 200 via the external interface and the receiving state holding FF 55 (S67 and S49 in FIG. 11). The administrator sets a code indicating the setting completion state (5) in the state FF 11 by using the MMB 200 via the external interface and the receiving state holding FF 55 (S50). The encoder 12 reads this code and generates a signal for sending the setting completion code. In accordance with the generated signal, the setting completion code is sent from a corresponding one of the AND elements 15 to the encountered LSI 100-2 (S68). The administrator sets a code indicating a linkup completion state (i.e., operating state) in the state FF 11 by using the MMB 200 via the external interface (S51).

At last in step S75, the administrator deletes the control flag set in step S71 in the manual mode FF 52 by using the MMB 200 via the external interface. As a result, the selector 56 selects the output from the state machine logic unit 6, and the state becomes a normal state.

In each step of the simple steps, the state machine logic unit 6, which is a hardware, automatically executes the operation of changing the state in accordance with the code set by the administrator in the state FF 11 via the external interface. The operation of changing the state is originally the operation of writing a code indicating the next state in the state FF 11. In the simple steps, the selector 56 selects the signal channel 60 instead of the output of the state machine logic unit 6. Thus, actually, the code indicating the next state is not written in the state FF 11 by performing the operation of changing the state. Instead, the code is obtained by the administrator from the hardware operating state holding FF 54 by using the MMB 200 via the external interface. Specifically, by polling the hardware operating state holding FF 54, the MMB 200 obtains, via the external interface, the code written in the hardware operating state holding FF 54. By referring to the obtained code, the administrator can detect the operation of the state machine logic unit 6 and can use this obtained code as data for performing debugging.

For example, the following case is assumed. That is, the state machine logic unit 6 is originally configured to change its operation in the order of state (1), state (2), and state (3). In contrast, in the above-described simple steps, when reference is made to the codes obtained from the hardware operating state holding FF 54, it turns out that the state machine logic unit 6 changed its operation in the order of state (1), state (2), and state (4). In this case, it can be determined that there is a failure in a logic circuit portion of the state machine logic unit 6 that changes the state from state (2) to state (3).

With the second method of the embodiment, the following advantages can be expected. That is, with the simple steps, the progression of the transition of the state using the state machine logic unit 6 can be operated from the MMB 200 via the external interface. It thus becomes easier to monitor the state and to promptly find out the cause of the failure. Since no RAM and the like are necessary for storing the history of all the linkup steps, necessary resources can be reduced, and hence, the cost can be reduced.

Figure 13:
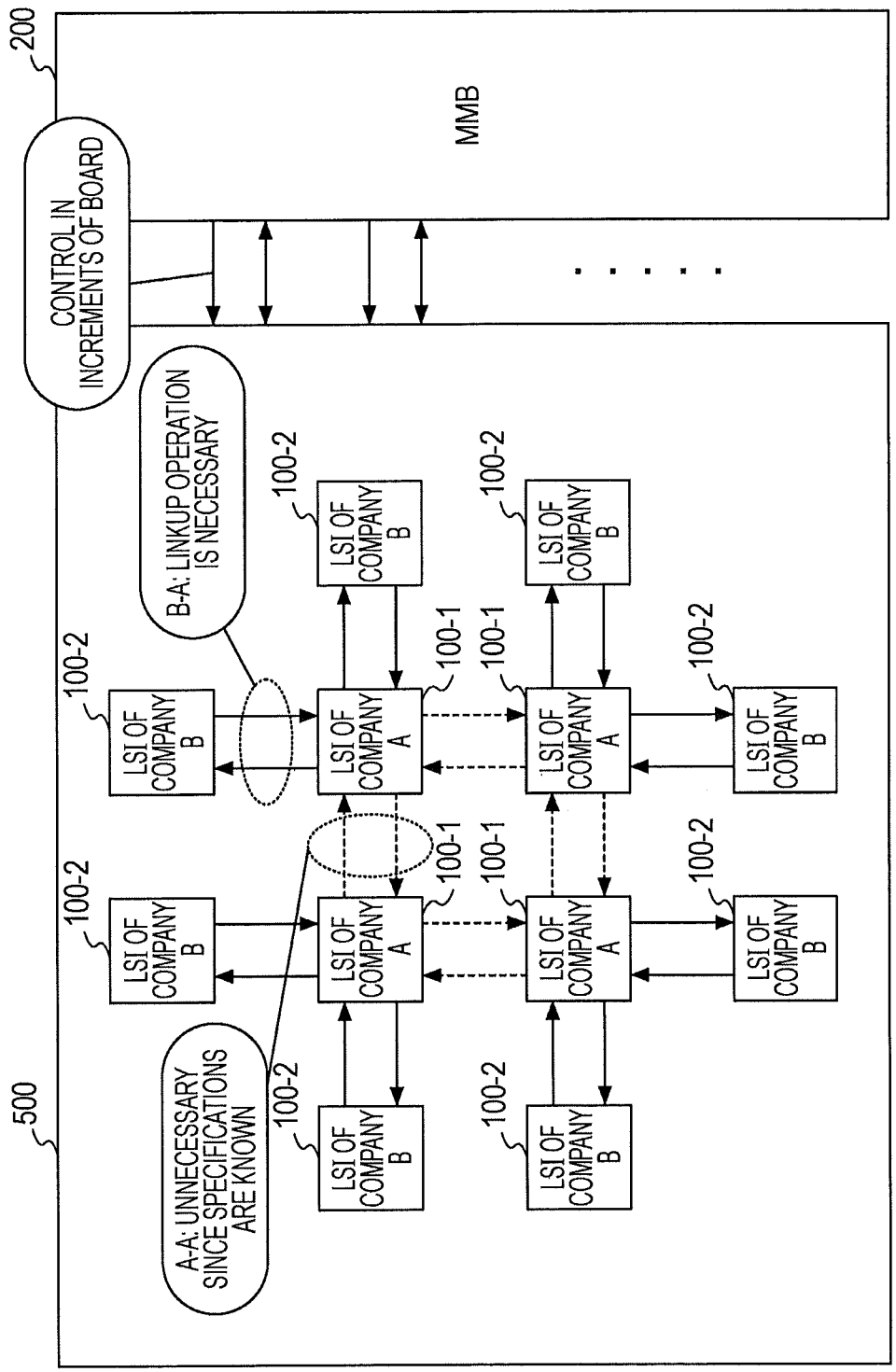
FIG. 13 is a block diagram for describing a structure example of an information processing system to which the first method of the embodiment and the second method of the embodiment are applicable.

According to another embodiment, an information processing system to which the first method and the second method of the embodiment are applicable will be described. FIG. 13 is a block diagram illustrating the structure of an information processing system 500 according to another embodiment. The information processing system 500 illustrated in FIG. 13 includes four LSIs 100-1 that each have the same structure as that of the LSI 100-1 of company A and eight LSIs 100-2 that each have the same structure as that of the LSI 100-2 of the different company B. As illustrated in FIG. 13, the four LSIs 100-1 and the eight LSIs 100-2 are connected to form a network so that the adjacent LSIs can mutually send and receive signals. The twelve LSIs 100-1 and LSI 100-2 in total are individually controlled by the MMB 200.

In the information processing system 500 illustrated in FIG. 13, two LSIs 100-1 of company A can be caused in advance to enter an operating state by performing the second method, i.e., the simple steps, of the embodiment. That is, the MMB 200 writes a code indicating a state in the state FF 11 of each of the two LSIs 100-1 that encounter each other via the external interface. As a result, a linkup state can be generated in each of the two LSIs 100-1, and the two LSIs 100-1 can be forced to enter an operating state. By adopting this method, a linkup operation that is supposed to be performed at the time the power of the information processing system 500 is turned on becomes unnecessary, and the period of time needed to perform the procedure at the time the power is turned on, namely, the power-on sequence, can be reduced.

Figure 14:
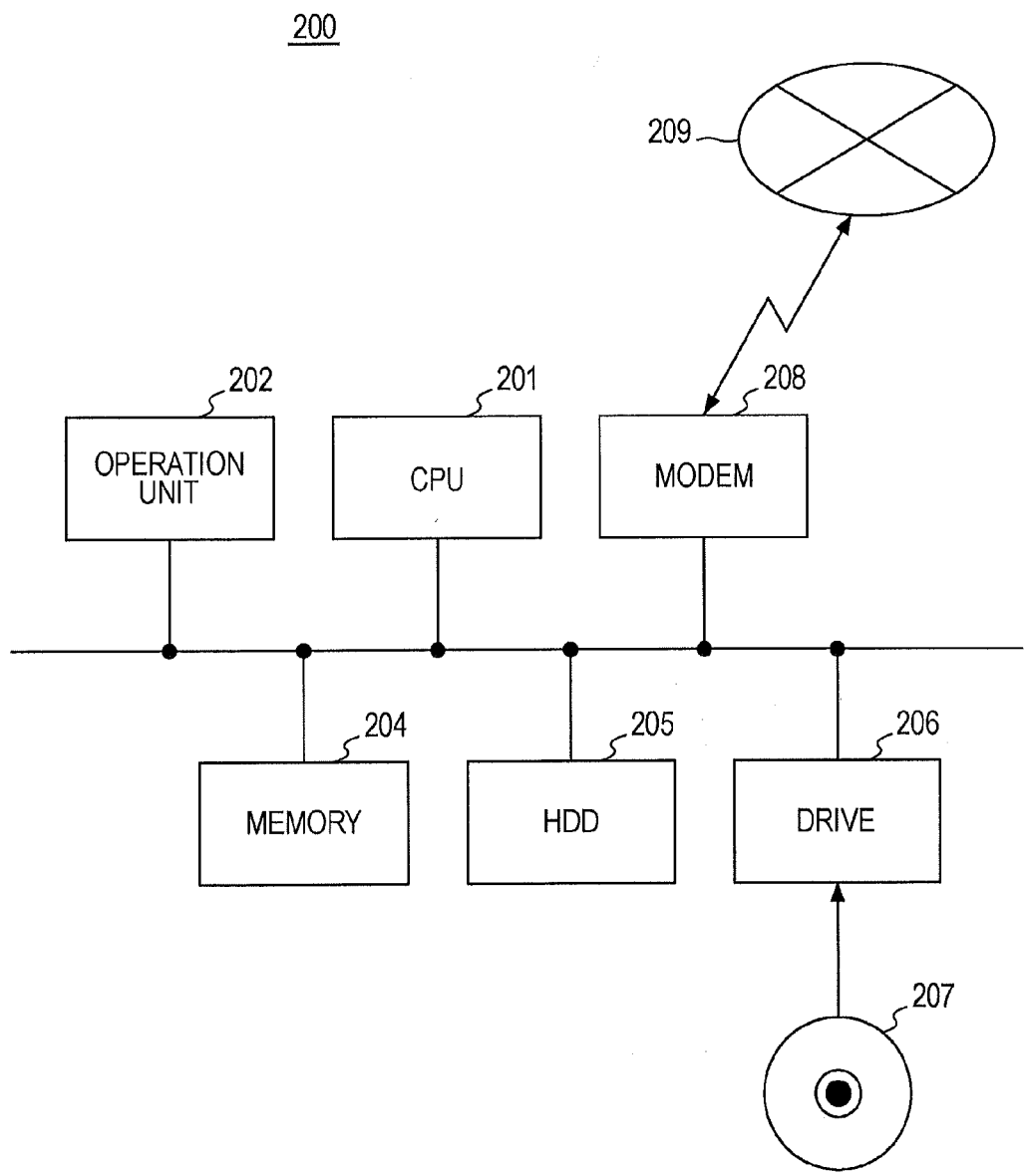
FIG. 14 is an illustration for describing a hardware structure example of a management board (MMB) illustrated in FIG. 7.

FIG. 14 is a block diagram illustrating a hardware structure example of the MMB 200. As illustrated in FIG. 14, the MMB 200 has the structure of a computer. The MMB 200 includes a central processing unit (CPU) 201 that executes various operations by executing commands included in a given program. The MMB 200 further includes an operation unit 202, a memory 204 that includes a ROM and a RAM, that stores programs executed by the CPU 201 and data, and that is used as a work area, and a hard disk drive 205 that stores programs and data. The MMB 200 further includes a compact-disc read-only memory (CD-ROM) drive 206 that loads programs and data from the outside via a CD-ROM 207. The MMB 200 further includes a modem 208 that downloads programs from an external server or the like via a communication network 209 such as the Internet or a local area network (LAN).

In the MMB 200 having the foregoing structure, a program for executing the first method, i.e., forced linkup, of the embodiment is written in the ROM of the memory 204. Alternatively, a program for executing the forced linkup is loaded via the CD-ROM 207 or downloaded via the communication network 209. This program is installed in the hard disk drive 205 and loaded to the memory 204 as needed. By executing, with the CPU 201, the program for executing the forced linkup, the first method, i.e., the forced linkup, of the embodiment can be automatically performed on LSIs serving as control targets by using the MMB 200 via the external interface.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A linkup state generating method for generating a state in which linkup is completed in first and second information processing apparatuses, the linkup state generating method comprising:

setting, from outside of the first information processing apparatus, a parameter in the first information processing apparatus so that a specification of the parameter set in the first information processing apparatus matches a specification of a parameter included in the second information processing apparatus for a linkup; and sending, from the first information processing apparatus, the parameter received from the second information processing apparatus back to the second information processing apparatus in a manner that the second information processing apparatus recognizes as part of the linkup that parameter exchange has been performed.

2. The linkup state generating method according to claim 1, wherein the sending of the parameter received from the second information processing apparatus back to the second information processing apparatus comprises:

sending a signal indicating parameter exchange preparation completion from the first information processing apparatus to the second information processing apparatus, when the first information processing apparatus receives a signal sent from the second information processing apparatus indicating parameter exchange preparation completion, and setting of the parameter in the first information processing apparatus from the outside of the first processing apparatus is completed;

sending a parameter from the second information processing apparatus to the first information processing apparatus, upon receipt of, at the second information processing apparatus, the signal sent from the first information processing apparatus indicating parameter exchange preparation completion;

upon receipt of, at the first information processing apparatus, the parameter sent from the second information processing apparatus, sending the parameter back to the second information processing apparatus; and sending a signal indicating completion of parameter setting in the second information processing apparatus from the second information processing apparatus to the first information processing apparatus, when the second information processing apparatus received a predetermined number of parameters sent from the first information processing apparatus;

wherein the first information processing apparatus sends the signal indicating completion of parameter setting to the second information processing apparatus, upon receipt of, at the first information processing apparatus, the signal indicating completion of parameter setting in the second information processing apparatus from the second information processing apparatus.

3. The linkup state generating method according to claim 2, wherein:

the setting, from the outside of the first information processing apparatus, includes setting information indicating a state of parameter exchange preparation completion for generating a signal indicating parameter exchange preparation completion, information indicating a parameter sending state for sending a parameter, and information indicating a state of completion of parameter setting for generating a signal indicating completion of parameter setting, to a state machine logic included in each of the first and second information processing apparatuses for the setting of the information indicating the state of parameter exchange preparation completion, the information indicating the parameter sending state, and the information indicating the state of completion of parameter setting.

4. A linkup state generating method for generating a state in which linkup is completed in first and second information processing apparatuses, the first and second information processing apparatuses each further including a state machine logic unit that changes the state of the information processing apparatuses in order to realize the linkup function, the linkup state generating method comprising:
  setting, from outside of the first information processing apparatus, a parameter in the first information processing apparatus so that a specification of the parameter set in the first information processing apparatus matches a specification of a parameter included in the second information processing apparatus for the linkup; and
  controlling, from the outside of the first information processing apparatus, operation of the state machine logic unit included in the first information processing apparatus,
  the setting of the parameter in the first information processing apparatus includes sending, from the outside of the first information processing apparatus, the parameter received from the second information processing apparatus back to the second information processing apparatus in accordance with a stage of parameter setting set to the state machine logic unit in the first information processing apparatus from the outside of the first information processing apparatus.

5. The linkup state generating method according to claim 4, wherein each of the first and second information processing apparatuses further includes a function of mutually notifying each other information processing apparatus of a state set by the state machine logic unit, the linkup state generating method further comprising:
  monitoring, from the outside of the first information processing apparatus, a state set by the state machine logic unit included in the first information processing apparatus;
  monitoring, from the outside of the first information processing apparatus, a state of the second information processing apparatus, the state being set by the state machine logic unit included in the second information processing apparatus and notified to the first information processing apparatus;
  setting, from the outside of the first information processing apparatus, in the first information processing apparatus, a set state in accordance with the state of the second information processing apparatus; and
  causing notifying to the second information processing apparatus the set state of the first information processing apparatus set from the outside of the first information processing apparatus.

6. An information processing apparatus comprising:
  a comparator that for a linkup with an encountered information processing apparatus exchanges own parameter with a parameter set in the encountered information processing apparatus, compares own parameter with the parameter set in the encountered information processing apparatus, and adjusts a specification of own parameter to match a specification of the parameter set in the encountered information processing apparatus; and
  means for forming a channel for sending the parameter received from the encountered information processing apparatus back to the encountered information processing apparatus in a manner that the encountered information processing apparatus recognizes as part of the linkup that parameter exchange has been performed.

7. The information processing apparatus according to claim 6, further comprising:
  a storage device that sets a parameter of the information processing apparatus to send the parameter of the information processing apparatus to the encountered information processing apparatus,
  wherein the means for forming the channel comprises:
    means for forming a channel for sending a signal sent from the encountered information processing apparatus indicating parameter exchange preparation completion back to the encountered information processing apparatus;
    means for forming a channel for sending a parameter sent from the encountered information processing apparatus back to the encountered information processing apparatus; and
    means for forming a channel for sending a signal sent from the encountered information processing apparatus indicating completion of parameter setting in the encountered information processing apparatus back to the encountered information processing apparatus.

8. The information processing apparatus according to claim 7, further comprising a state machine logic unit that generates the signal indicating parameter exchange preparation completion, that sends information indicating a state of parameter exchange preparation completion, that generates information indicating a parameter sending state for sending a parameter and the signal indicating completion of parameter setting, and that sets information indicating a state of completion of parameter setting.

9. An information processing apparatus including a linkup function with parameter exchange by comparing a parameter with a parameter set in an encountered information processing apparatus and adjusting a specification of the parameter to match a specification of the parameter set in the encountered information processing apparatus, the information processing apparatus comprising:
  a state machine logic unit that sequentially changes a state of the information processing apparatus to realize the linkup function; and
  an interface forming a channel for a signal for allowing controlling and monitoring, from outside of the information processing apparatus, operation of the state machine logic unit,
  wherein a parameter received from the encountered information processing apparatus is sent back, using the interface, to the encountered information processing apparatus in accordance with a stage of parameter setting set to the state machine logic unit for the information processing apparatus so that the encountered information processing apparatus recognizes as part of the linkup that the parameter exchange has been performed.

10. The information processing apparatus according to claim 9, the encountered information processing apparatus is notified using the interface of a state set by the state machine logic unit; and
    a state in accordance with a state set by the state machine logic unit included in the encountered information processing apparatus is set in the information processing apparatus from the outside of the information processing apparatus using the interface.

11. A computer-readable recording medium storing a linkup state generating program for causing a computer that controls a computer system including first and second information processing apparatuses to execute a linkup state generating method for generating a state in which linkup is completed in the first and second information processing apparatuses, the program causing the computer to execute:
    setting, from outside of the first information processing apparatus, a parameter in the first information processing apparatus so that a specification of the parameter set in the first information processing apparatus matches a specification of the parameter included in the second information processing apparatus for the linkup; and
    causing formation of a signal channel for sending, from the first information processing apparatus, the parameter received from the second information processing apparatus back to the second information processing apparatus in a manner that the second information processing apparatus recognizes as part of the linkup that parameter exchange has been performed.

12. The recording medium according to claim 11, wherein the program causes the computer to further execute:
    after a stage at which the first information processing apparatus receives a signal sent from the second information processing apparatus indicating parameter exchange preparation completion, and the setting of the parameter in the first information processing apparatus is completed from the outside of the first information processing apparatus, causing formation of a signal channel for sending, from the first information processing apparatus, the signal indicating parameter exchange preparation completion to the second information processing apparatus; and
    causing formation of a signal channel for sending, from the first information processing apparatus, a signal sent from the second information processing apparatus indicating completion of parameter setting in the second information processing apparatus back to the second information processing apparatus.

13. The recording medium according to claim 12, wherein the program causes the computer to further execute:
    setting, from the outside of the first information processing apparatus, information indicating a state of parameter exchange preparation completion for generating a signal indicating parameter exchange preparation completion, information indicating a parameter sending state for sending a parameter, and information indicating a state of completion of parameter setting for generating a signal indicating completion of parameter setting to a state machine logic included in each of the first and second information processing apparatuses that is to set the information indicating a state of parameter exchange preparation completion, the information indicating a parameter sending state, and the information indicating a state of completion of parameter setting.

14. A computer system, comprising:
a first information processing apparatus;
a second information processing apparatus; and
a management computer controller that matches a parameter set in the first information processing apparatus to a parameter set in the second information processing apparatus,
wherein the first and second information processing apparatuses link up based upon the parameter matching by the management computer controller and by the second information processing apparatus sending the parameter to the first information processing apparatus and the first information processing apparatus looping back the parameter received from the second information processing apparatus for the second information processing apparatus to recognize as part of the linkup that parameter exchange has been performed.

15. An information processing apparatus comprising:
a first processor;
a second processor; and
a management circuit configured to set, from the management circuit, a parameter in the first processor so that a specification of the parameter set in the first processor matches a specification of a parameter set in the second processor for a linkup, wherein
the second processor sends the parameter to the first processor and the first processor sends the parameter received from the second processor back to the second processor in a manner that the second processor recognizes as part of the linkup that parameter exchange has been performed.

\* \* \* \* \*